Aug. 13, 1940. A. G. PETERSON Re. 21,531
PORTABLE PARTITION
Original Filed Dec. 7, 1936
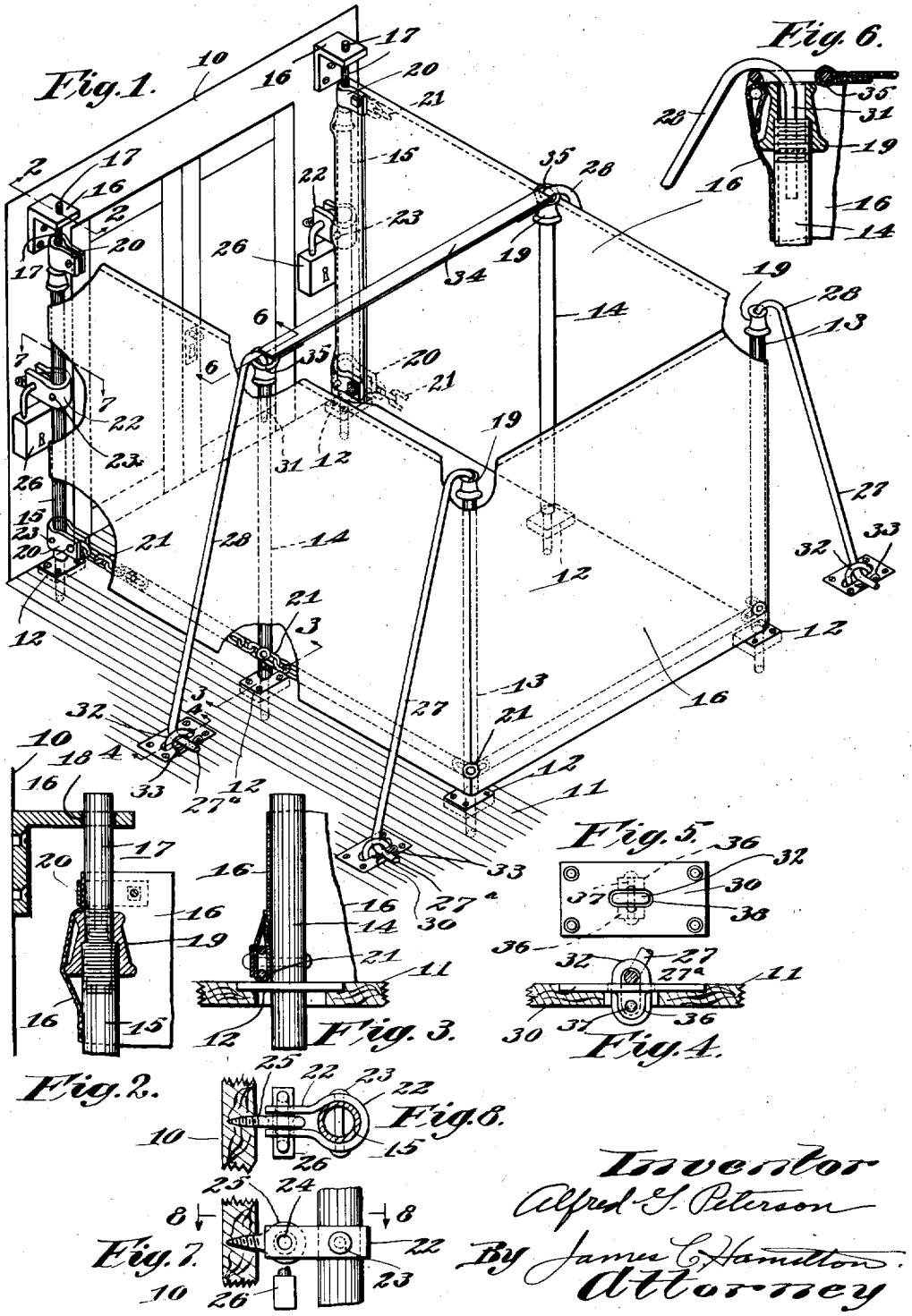

Reissued Aug. 13, 1940

Re. 21,531

UNITED STATES PATENT OFFICE 21,531

PORTABLE PARTITION

Alfred G. Peterson, Milton, Mass., assignor to The Kroger Grocery & Baking Company, Cincinnati, Ohio Original No. 2,105,095, dated January 11, 1938, Serial No. 114,530, December 7, 1936. Application for reissue September 15, 1939, Serial No. 295,159

6 Claims. (Cl. 20—1.6)

My present invention relates to portable partitions and more particularly to a collapsible portable partition which may be erected on the inside of stores facing the outer doors. Such partitions are particularly desirable in connection with chain stores and the like or in connection with delivery of goods to places of business where the time of delivery may be several hours prior to the opening of the establishment for business. Under such circumstances it is desirable that goods may be delivered within the place of business but at the same time restrict the space of such delivery and segregate it from the rest of the surrounding space. This is particularly pertinent in grocery stores where the main entrance opens into the display space of the store. At the same time such a device must be so designed that it may be taken down easily and quickly and present no obstruction which will interfere with the normal business space of the room in which it is used.

Having the various facts in mind I have designed a compact and sturdy structure which may be erected in a few moments of time and when not in use be either rolled up or removed entirely from the room.

The principal object of my invention is an improved portable partition;

Another object is an improved portable partition which is provided with rigid floor supporting members which cannot be removed except from the inside of the room in which the partition has been erected;

Still another object is an improved means of anchoring the supporting members in the said floor, and Other objects and novel features comprising the construction and operation of my invention will appear as the description of the same progresses.

In the drawing illustrating the preferred embodiment of my invention,

Fig. 1 is a perspective view of the apparatus which has been erected on the inside of a room adjacent the outside doors, portions of which have been broken away;

Fig. 2 is a detail cross-section taken on the line 2—2 of Fig. 1;

Fig. 3 is a detail cross-section taken on the line 3—3 of Fig. 1;

Fig. 4 is another detail cross-section taken on the line 4—4 of Fig. 1;

Fig. 5 is a plan view of the detail shown in Fig. 4;

Fig. 6 is a cross-section taken on the line 6—6 of Fig. 1;

Fig. 7 is still another cross-section taken on the line 7—7 of Fig. 1, and

Fig. 8 is another cross-section taken on the line 8—8 of Fig. 7.

Referring more in detail to the drawing illustrating my invention, 10 indicates the inside of a pair of doors which communicate with the outside street and a store interior. 11 indicates the floor of the interior of such store. At certain places on the floor 11 I have indicated plates 12 which are set into the floor flush with the top surface and in which are inserted the vertical posts 13, 14 and 15 more clearly shown in Fig. 3 of the drawing.

Surrounding the posts 13, 14 and 15 on their outer sides is a heavy fabric enclosure material 16. This material 16 is preferably solidly attached to the top and bottom of the posts 13, 14 and 15 for the purpose of drawing the enclosure material tight and preventing a trespasser from pulling it down and stepping over the edge into the interior of the store. Preferably the fabric 16 encloses the posts 15. The posts 15 are held at their top ends by means of an angle bracket 16 which is secured to the door casing 10, the reduced end 17 passing through an orifice 18 provided for the purpose in the said bracket 16. The lower end of the member 17 is threaded and engaged in a fitting 19 which is screwed to the upper end of the post 15. This construction is better shown in Fig. 2. Adjacent the lower end of the posts 15 I have provided a clamp member 20 which surrounds the fabric and posts 15 at this point and between the ends of which I have anchored a small chain 21 which encircles the entire enclosure terminating at a similar clamp on the opposite side adjacent the door frame 10. Preferably the chain 20 is enclosed by a fold of the fabric 16, portions of which are broken away to show the chain and its fastening rivets 21 which attach it to the several posts 13 and 14. On the outer corners of the enclosure I prefer to place the rivets outside of the fabric. This chain which is inclosed in the fabric 16 and anchored at the bottom portions of the posts prevents anyone from lifting the lower edges of the fabric and passing underneath it. At a point about midsection of the posts 15, I have positioned another clamp 22 preferably riveted to the post 15, as indicated at 23. The open ends of the clamp 22 are provided with orifices 24. Directly opposite the open ends of the clamps 22 and between such ends I have located a screw-eye 25, the screw end of which is solidly imbedded in the door casing 10. Through the orifices 24 of the clamps 22 and the screw-eye 25 I place a padlock 26 which secures the posts 15 against being raised without first removing the padlock 26.

The posts 13 and 14 are braced by means of guy rods 27 and 28 the lower ends of which are bent to form angles 27a, the outer ends of which are slightly tipped up so that it is practically impossible for a person inside the enclosure to slide them out from under the link 29 which is mounted in the floor plates 30. The upper ends of the rods 27 and 28 are bent downwardly, as shown at 31, and are inserted in the top of the fitting 19 which is screwed to the hollow posts 15, 14 and 13. This downwardly bent end 31 of the rods 28, may be extended down below the fitting into the posts 15, 14 and 13, as shown in the drawing. As a double assurance that the rods 28 cannot be removed from the floor plates 30 from within the inclosure, I have provided orifices in the angle ends of the rods 28 which pass through the links 32 located in the floor plates 30, through which I insert cotter-pins 33. These cotter-pins cannot be reached from the inside of the inclosure and must be reached by someone within the room surrounding the inclosure.

Across the central portion of the inclosure and connecting with the posts 14, I have provided an overhead strap 34, each end of which is provided with rings 35. The rings 35 are mounted over the fixtures 19 when assembling the structure, and the bent ends 31 of the rods 28 are passed down through the rings 35, the fixture 19 and into the hollow rods 14 thereby holding the side posts and the fabric 16 firmly in place. The location of the floor plates 30 may be positioned at an angle of forty-five degrees to the posts 13 if it is found that additional bracing is necessary in order to maintain the fabric in a tight position.

In any installation of this character, it is absolutely imperative that no obstacles be placed in or on the floor 11 of the store which might be obstructions which would trip or otherwise contribute to an injury by falling of any customer who might encounter such object; therefore, I have designed a floor plate and link assembly which when not in use presents a smooth upper surface which has no upstanding projections but which when it is desired, the inclosure above described can be elevated to provide an anchor through which the angle end of the rods 28 may be inserted, as shown in Figs. 1, 4 and 5. This plate 30 is provided with depending bracket members on its lower side through which I have located a pin 37 which passes through the inner opening of a link 32. Due to the fact that the link 32 is elongated and fits loosely around the pin 37 it may be drawn up through a slot 38 located in the top surface of the plate 30 when the apparatus is in use, as in Fig. 1, and when not in use, the link 32 will fall back below the floor surface of the plate 30.

In operation the apparatus is assembled, as shown in Fig. 1. A delivery man who has keys to the outside doors located within the door frames 10, delivers his goods within the inclosure but cannot get access to the interior of the store surrounding the inclosure without in some way destroying some portion of the inclosure structure. If such destruction occurs the responsible party is easily traceable.

When the operator or manager opens the store in the morning, after the goods have been delivered, he unlocks the padlocks 26, raises the posts 15 and enters the store room. The rods 28 are now removed together with the strap 34 and the other posts 14 and 13 are removed after which the fabric 16 and posts are rolled up and either placed in the back room or confined against one of the walls adjacent the door frame.

It will be seen that the guy rods 27 and 28 may be readily hooked into the upper ends of the posts 13 and 14 from the floor level without unnecessary reaching, and may be as readily unhooked therefrom. When these rods are anchored to the floor, it is practically impossible for one inside the enclosure to reach up and disengage the rods from the posts. When the enclosure is taken down, the lower ends of the rods 27 and 28 may be quickly and easily removed from the links 32, the latter immediately dropping down below the level of the floor without causing any impediment or obstruction to persons in the store, thereby avoiding liability of injury to patrons.

Flexible wire may be substituted for the chains 21, at the top and bottom of the fabric 16 if desired, or any other non-yielding element which lends itself to flexibility will suffice equally well. Under certain conditions I may not use the upper chain or wire reinforcement at all. This factor is governed somewhat by the size of the inclosure and the distance between the posts 13, 14 and 15 or multiples of posts 14.

Having thus described by invention what I claim as new is:

1. In an improved portable partition enclosure adapted to surround the inside area of a room adjacent the outside entrance, the said enclosure comprising a vertical fabric wall supported by means of hollow posts attached to said fabric wall and mounted in the floor of said room, a central strap member transversely positioned across the upper central area of said fabric wall having anchor rings located at the ends thereof, rigid brace rods adapted to connect with said wall and said floor, the upper end of said rods being bent to form a hook, the end of the hook being inserted through the said rings and down into the hollow end of said posts, the floor end of said rods being bent at right angles to the said rods and parallel with said floor, a link pinned through a floor plate, the said plate pin being located below the upper surface of the said plate for the purpose of allowing the said link to drop below the top surface of said plate when not in use, the right angle bent portion of said rods being adapted to be inserted through the upper end of said link when said rods are attached to said wall posts.

2. In a portable partition enclosure adapted to surround the inside area of a room adjacent an outside entrance, the said enclosure having flexible side walls of fabric or analogous material supported by means of upright posts attached to said walls and removably anchored in the floor of the room, rigid brace rods for bracing said enclosure, said rods and said posts having interengaging means at their upper ends whereby the rods may be readily hooked onto said posts and unhooked therefrom, and means detachably connecting the floor end of each of said rods to said floor.

3. In a portable partition enclosure adapted to surround the inside area of a room adjacent an outside entrance, the said enclosure having side walls of fabric or like flexible material supported by means of posts attached to said walls and removably anchored to the floor of the room, the upper ends of said posts being of hollow construction, rigid brace rods for bracing the enclosure each having its upper end bent to form a hook with the end of the hook inserted into the upper ends of said posts, and means detachably anchoring the floor end of said rods to said floor.

4. In an improved portable partition enclosure adapted to surround the inside area of a room adjacent an outside entrance, the said enclosure having flexible walls of fabric or analogous material supported by means of posts attached to said walls and detachably anchored in the floor of the room, the upper ends of said posts being of hollow construction, a strap member positioned transversely across the top of said enclosure and having anchor rings located at opposite ends thereof and overlying the upper ends of adjacent posts, rigid brace rods adapted to connect with said posts and with the floor, the upper end of said rods being bent to form a hook with the end of the hook inserted through one of said rings and down into the hollow end of one of said adjacent posts, and means detachably anchoring the floor end of each of said rods to the floor.

5. In a portable partition enclosure adapted to surround the inside area of a room adjacent an outside entrance, the said enclosure having side walls of fabric or analogous flexible material supported by means of posts attached to said walls and detachably anchored to the floor of said room, means for bracing the enclosure including guy rods detachably connected at their upper ends to the upper ends of said posts, the floor end of each of said rods being bent at an angle to the rod and substantially parallel with the floor, floor plates for the lower ends of said guy rods, a link movably mounted in an opening through each of said plates, the bent floor end portions of each of said rods being insertable through the upper end of said link when the rods are attached to said wall posts, the link dropping down below the floor level when the floor ends of the rods are disconnected therefrom.

6. In a portable partition enclosure adapted to surround the inside area of a room adjacent an outside entrance, the said enclosure having side walls of fabric or analogous flexible material supported by means of posts attached to said walls and detachably anchored to the floor of said room, means for bracing the enclosure including guy members detachably connected at their upper ends to said posts, means for detachably connecting the lower ends of said guy members to the floor including a floor plate formed with an opening therethrough and a link mounted for limited vertical movement in said opening, the lower end of each of said guy members being constructed to engage said link when said members are attached to said wall posts, the link dropping down below the floor level when the guy members are disconnected therefrom.

ALFRED G. PETERSON.